Figure 1:
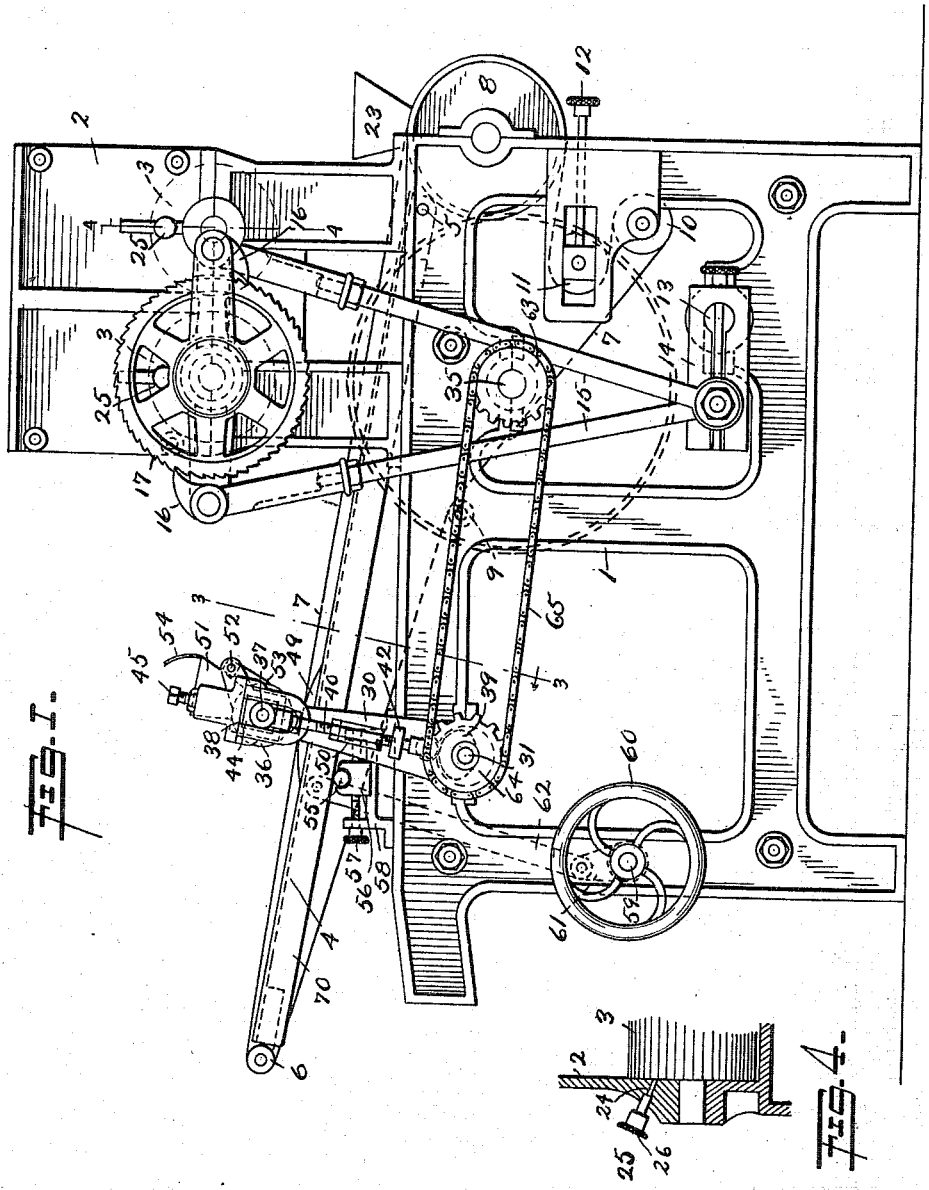

J. J. LINDEN.
DOUGH SHEETING MACHINE.
APPLICATION FILED JUNE 30, 1909. RENEWED APR. 20, 1911.

994,850.

Patented June 13, 1911.

2 SHEETS—SHEET 2.

WITNESSES:
G. Robert Thomas
J. E. Lasher

INVENTOR
John J. Linden
BY
[signature]
ATTORNEY

UNITED STATES PATENT OFFICE.

JOHN J. LINDEN, OF NEW YORK, N. Y., ASSIGNOR TO THE J. H. DAY COMPANY, OF CINCINNATI, OHIO, A CORPORATION OF OHIO.

DOUGH-SHEETING MACHINE.

994,850.  Specification of Letters Patent.  Patented June 13, 1911.

Application filed June 30, 1909, Serial No. 505,123. Renewed April 20, 1911. Serial No. 622,327.

*To all whom it may concern:*

Be it known that I, JOHN J. LINDEN, a citizen of the United States, residing in the borough of Manhattan, city, county, and State of New York, have invented a new and useful Dough-Sheeting Machine, of which the following is a specification.

My invention relates to improvements in dough-sheeting machines, the object, in general, being to produce a machine at once simple and efficient for the purpose. In such machines the great defect has been uneven rolling of the dough.

The main aim of the present invention is to insure evenness of rolling, to prevent the dough adhering to the roller, to smooth the surface and to close up the pores of the sheet of dough.

It may be premised that the invention relates to a sheeting machine in which a roller moves back and forth over a bed, the dough being carried along over the bed by a traveling apron. I secure evenness of rolling by causing the roller to roll along on the dough, exerting substantially constant pressure on the dough during such rolling movement; and I prevent the dough sticking to the roller and being pushed back, on the return or inoperative stroke, by causing the roller to be elevated during this movement.

The invention consists, primarily, in a sheeting roller, a pair of oscillatory arms for moving said roller back and forth, and means, as cam mechanism, whereby the roller is elevated on the inoperative stroke and lowered on the operative or rolling stroke. Preferably, the bed beneath the roller is arched, substantially on an arc concentric with the pivotal axis of the oscillatory arms, whereby the roller, during its operative stroke, bears with constant pressure on the dough.

The invention also relates to a flour box carried by said arms over said roller, to oscillate with the arms and roller. Preferably, the apron carrying the dough over the bed beneath the roller is caused to travel in a step-by-step manner, traveling forward on the inoperative stroke of the arms and roller, and remaining stationary during the rolling or operative stroke.

The invention also comprises certain other features of construction, which will be described and claimed hereinafter, particularly means for adjusting the relation between the roller and bed, and means for quickly raising and lowering the table carrying the bed.

Another difficulty, heretofore experienced in such machines, is the clogging of the feed rolls in the dough box. This clogging is due to the entrance of dough and other materials fed from the box between the ends of the rolls and the side walls of the box, where, particularly after the machine has stood idle for a time, such material thickens and solidifies, thus retarding or entirely stopping the action of the rolls.

It is another object of this invention to relieve this difficulty by providing lubricating devices having their discharge openings extended through the walls of the dough box against the ends of the rolls within.

Figure 2:
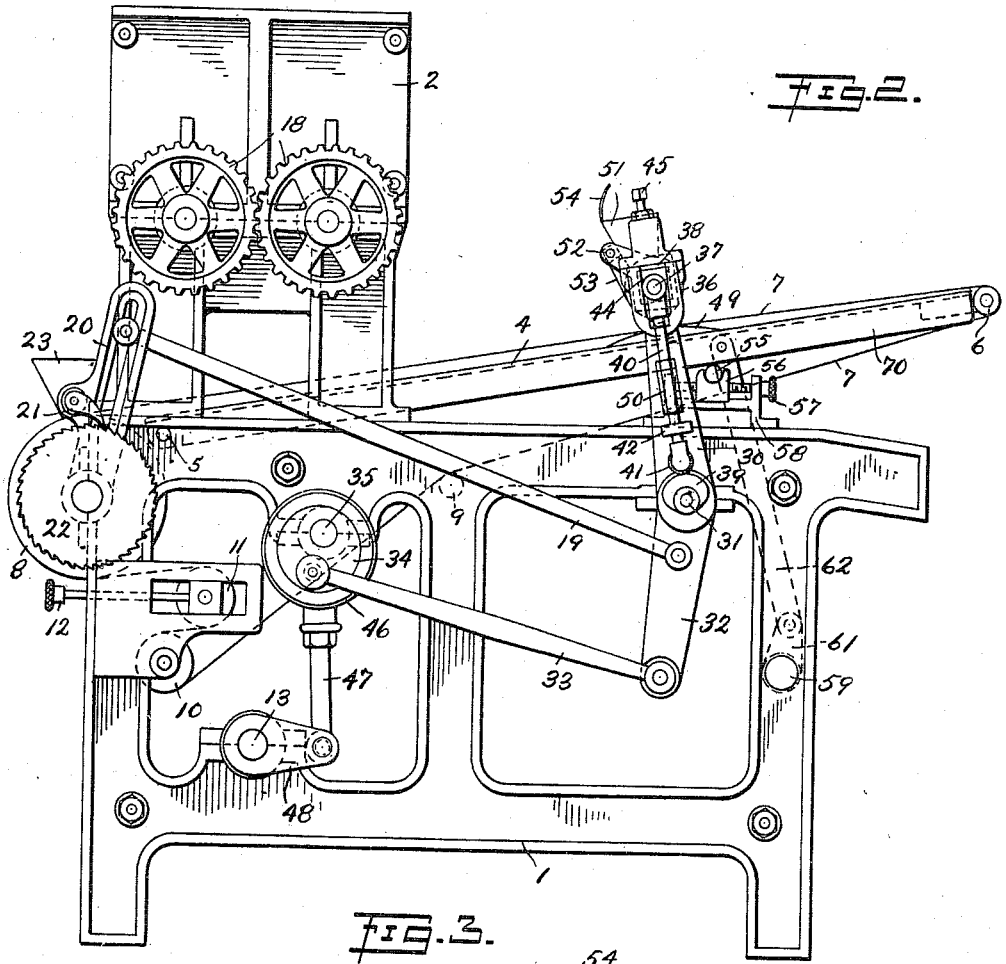
Figure 3:
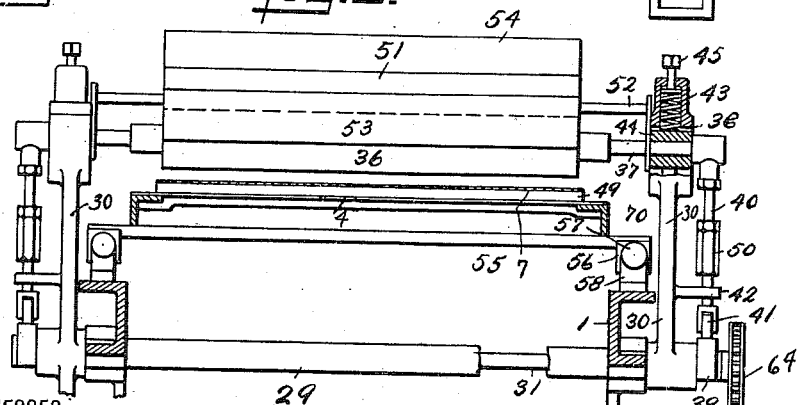

In the accompanying drawings, Figure 1 is a side elevation of a machine embodying the improvements, Fig. 2 is an elevation of the other side of the machine, Fig. 3 is a section on the line 3—3, Fig. 1, looking in the direction of the arrow, and Fig. 4 is a section on the line 4—4, Fig. 1.

Referring now to these views, the numeral 1 designates any suitable frame or supporting structure, 2 a suitable hopper or dough box, having suitable feeding rolls 3 therein, 4 a table supported by the frame and having an idler roller 6 at its front end, 7 an endless conveyer or apron, passing around driving roller or pulley 8, said roller 6, over idler 9, and about idlers 10 and 11 of a belt-tightener 12. The feeding rolls 3 are operated from an oscillatory shaft 13, having a variable crank 14, through links 15, pawls 16, a ratchet-wheel 17 on the shaft of one of said rolls, and meshing gears 18 mounted on the shafts of the two rolls. The driving roller 8 is given a step-by-step motion by means of a reciprocatory link 19, an oscillatory, variable-throw arm 20, a pawl 21, and a ratchet-wheel 22. A flour box 23 may be attached to the rear portion of the frame to dust the upper surface of the apron.

A novel feature of the machine which may be described at this point is the provision for lubricating the ends of the feed rolls 3. Openings 24 are preferably formed through the side walls of the dough box 2 opposite the ends of the rolls, and devices, as lubricating cups 25, are mounted on the outside of the box to discharge lubricant through said openings against the ends of the rolls. The lubricant, such as lard, may be forced against the rolls from time to time, by screwing down the caps 26 or otherwise applying pressure to the contents. I regard it as broadly new in a dough feed box, having coacting rolls therein, to provide lubricating devices adapted to admit lubricant between the ends of the rolls and the side walls of the box.

Coming now to the most important part of the invention, the numeral 30 indicates two upward extending arms, preferably disposed one at each side of the table 4, and mounted for oscillation, as by being secured to a hollow oscillatory shaft 29. Naturally, any suitable means may be employed for oscillating these arms. According to the illustration, one of the arms 30 is provided with an extension 32 below the shaft 31, and a link 33 connects this extension with the face of an eccentric 34 mounted on a main driving shaft 35. An idler sheeting roller 36 is carried by said arms 30, over the table 4 and apron 7, being mounted for movement up and down on said arms. A convenient expedient is to pass the journal portions 37 of said roller through slotted openings 38 in the upper parts of said arms, the journal portions 37 being desirably received in journal boxes 44 slidable in said slotted openings 38. Suitable mechanism for causing said roller 36 to reciprocate up and down on the arms 30 includes cams 39, which may be revoluble as by being secured to revoluble shaft 31 within shaft 29, and connecting push-rods 40. Said rods 40 may be provided on their lower ends with anti-friction rollers 41 for contact with the peripheries of said cams, and at their upper ends may move the roller 36 by being secured to the roller boxes 44. The rods 40 are preferably carried by the arms 30, passing through guide portions 42 thereon. Preferably, springs 43 are provided for urging the roller 36 downward and for applying the proper pressure to the dough. They may bear against the upper sides of said slidable boxes 44, and their tension may be adjusted, as by screws 45. The shaft 31 and the cams 39 may be revolved by means of sprockets 63, 64, and chain 65. The actuating parts are so arranged and timed that the roller 36 is held elevated during the return stroke, and is lowered for the rolling stroke. It is also arranged so that the apron 7 will be advanced during the inoperative or rearward movement of the roller 36 and held stationary during the forward or rolling movement of said roller.

The link 19 of the apron-actuating mechanism may be connected to the extension 32. Also, the oscillatory shaft 13 may be actuated by the eccentric 34, eccentric strap 46, rod 47, and crank-arm 48. But it will be obvious that the particular gearing arrangements are immaterial.

The numeral 49 designates an arched bed, preferably carried by or part of the table 4, directly above which bed the roller 36 has its path of travel. The arc of this bed is substantially concentric with the axis of oscillation of the arms 30.

I provide a stop for adjustably limiting the extent of downward movement of the roller 36, so as to adjust the pressure exerted by the roller on the dough upon the apron. This stop may be a nut 50, threaded on rod 40, so as to be adjustable up and down thereon, and adapted to contact with the upper surface of the portion 42 of the arm 30. Preferably, there is a nut 50 on each rod 40. I prefer to provide a second relative adjustment between the roller 36 on the one hand and the bed 49 and apron 7 on the other, by raising the bed up and down. This is desirably effected by a supporting rod extending transversely beneath the table 4, as indicated at 55; the same being mounted on blocks 56, which are slidable backward and forward by means of screws 57 swiveled in brackets 58 on the sides of the frame 1. Since the table 4 is inclined to the direction of movement of the rod 55, adjustment of the rod backward raises the bed slightly, whereas adjustment forward permits the bed to sink slightly. The table is mounted pivotally on the frame 1, preferably by means of a pivot connection 5. Of course, this raising and lowering of the table shifts the bed 49 slightly out of concentricity with the shaft 29, but the pivot 5 is so remote from the bed 49 that this displacement from concentricity is negligible. I wish to call attention to an important phase of this part of the invention, which is that the fine adjusting and sustaining mechanism, preferably embodied in the parts 55, 56 and 57, affords means for effecting transverse angular adjustment of the bed 49. Since the blocks 56 and screws 57 are, practically speaking, independent, one block may be adjusted farther backward or forward than the other, whereby one side of the table 4, and consequently of the bed 49, is raised higher than the other, or vice-versa. For this purpose the table 4 is made comparatively flexible, as sheet iron. The longitudinal edges of the table may be strengthened by angle irons or flanges 70. I regard independent adjusting and sustaining devices for angularly adjusting the bed laterally in either direction, as broadly new. The importance of this capability of the machine is that the bed 49 may be adjusted with reference to the roller 36, so that the sheet of dough passing away from the roller is exactly as thick at one side as the other. Thus when this sheet passes to the opposed rolls of a cutting machine, for example, one side of the sheet will not pass through the rolls slower or faster than the other side. The rod 55 also serves as a reinforce to sustain the bed 49 and table 4 under the pressure of the roller 36.

A feature of the invention is a flour box or trough 51 carried by the oscillatory arms 30 directly over the roller 36 to oscillate therewith. I am of course aware that flour boxes for dusting purposes are common, but not, I believe, mounted in this fashion. The box may be secured to a rod 52 rigidly secured to the arms 30; and its open bottom is practically filled by the roller 36. Preferably, a scraper 53 is also carried by the arms to coöperate with the roller 36 at the back thereof, being conveniently secured to the same rod 52. A valuable and novel feature is the provision on this oscillatory box 51 of an upward and forward inclined or curved guard-plate 54 carried by the back of the box. This guard plate prevents flour intended to be thrown into the box while in motion from being thrown over the box onto the apron and dough behind, and also returns back into the box such flour as may be dashed up by the movement thereof.

A minor but valuable feature of the invention resides in a toggle device for quickly lowering the table 4 and bed 49 entirely out of operative relation to the roller 36, and for restoring it to position when desired. This device comprises, preferably, a shaft 59, journaled in the frame 1, with hand-wheel 60, crank-arm 61, and link 62, pivoted to the crank-arm and to the table. It is desirable that the crank-arm 61 and link 62 be duplicated for the two sides of the machine. Naturally, the rod 55 is removed from the blocks 56, before the bed is lowered by means of the toggle device.

What I claim as new is:—

1. In a dough-sheeting machine, a frame or support, oscillatory arms mounted thereon by fixed pivotal connection, mechanism for oscillating said arms, a sheeting roller carried by said arms to be moved back and forth thereby, and mechanism for moving said roller up and down with respect to said arms, whereby said roller is lowered for one stroke and elevated for the reverse stroke.

2. In a dough-sheeting machine, a frame or support, a bed, oscillatory arms mounted on said support by fixed pivotal connection below said bed, mechanism for oscillating said arms, a sheeting roller carried by the upper parts of said arms to be moved thereby back and forth over said bed, and mechanism for moving said roller up and down with respect to said arms, whereby said roller is lowered toward said bed for one stroke and elevated therefrom for the reverse stroke.

3. In a dough-sheeting machine, in conjunction with a bed, oscillatory arms, a roller carried by said arms to be oscillated thereby back and forth over said bed, push-rods carried by said arms for lifting said roller, and cams for actuating said push-rods, whereby the roller is lowered for one stroke and elevated for the reverse stroke.

4. In a dough-sheeting machine, a frame or support, oscillatory arms mounted thereon by fixed pivotal connection, mechanism for oscillating said arms, a sheeting roller carried by said arms to be moved back and forth thereby, mechanism for moving said roller up and down with respect to said arms, whereby said roller is lowered for one stroke and elevated for the reverse stroke, and resilient means tending to force said roller downward.

5. In a dough-sheeting machine, a frame or support, oscillatory arms mounted thereon by fixed pivotal connection, mechanism for oscillating said arms, a sheeting roller carried by said arms to be moved back and forth thereby, and mechanism for moving said roller up and down with respect to said arms, whereby said roller is lowered for one stroke and elevated for the reverse stroke, said roller being mounted in said arms in slidable bearings.

6. In a dough-sheeting machine, a sheeting roller, means for moving the same back and forth, a flour-box mounted thereover to travel therewith, and an upward and forward directed guard plate carried by the back of said box and extending over the open top thereof.

7. In a dough-sheeting machine, an oscillatory sheeting roller, oscillatory arms for oscillating said roller, means for reciprocating said roller up and down, and a bed disposed beneath said roller for coöperation with the same, having an arcuate surface.

8. In a dough-sheeting machine, an oscillatory sheeting roller, oscillatory arms for oscillating said roller, means for reciprocating said roller up and down, and an arched bed disposed beneath said roller for coöperation with the same.

9. In a dough-sheeting machine, in conjunction with a bed, oscillatory arms, a roller carried by said arms to be oscillated thereby back and forth over said bed, cam mechanism, whereby said roller is maintained elevated for one stroke and lowered for the other stroke, and an adjustable stop for limiting the downward movement of said roller.

10. In a dough-sheeting machine, in conjunction with a sheeting roller, a frame, a table pivoted thereto and presenting a bed beneath the roller remote from the pivot, said table being comparatively flexible, blocks mounted on the frame for movement forward and backward beneath opposite sides of said bed, a rod for sustaining said bed mounted at its ends on said blocks but permitting independent forward and backward movement thereof, and independent adjusting screws connected with said blocks, whereby movement of the blocks in one direction raises the bed and movement in the opposite direction lowers the same, and movement of one effects angular adjustment of the bed.

11. In a dough-sheeting machine, a frame or support, a bed pivotally supported thereby for movement up and down, a rod disposed transversely beneath said bed and upon which said bed rests, movable blocks mounted on said support and carrying said rod, and means for adjusting said blocks back and forth in a direction at a slight angle to the coöperating under surface of said bed, said rod being removable from said blocks, whereby the bed may be lowered to rest upon the frame or support.

12. In a machine of the character described, a dough-box, feed-rolls therein, and lubricating devices adapted to deliver lubricant between the ends of said rolls and the adjacent walls of the box.

13. In a machine of the character described, a dough-box, feed-rolls therein, the portions of the walls of said box opposite the ends of said rolls having openings therethrough, and lubricating devices on the outside of said walls adapted to deliver lubricant through said openings against the ends of said rolls.

14. In a dough-sheeting machine, in conjunction with a bed, oscillatory arms, a roller carried by said arms to be oscillated back and forth over said bed, cam mechanism whereby said roller is lowered for one stroke and elevated for the reverse stroke, and independent adjustable stops associated with the arms for limiting the downward movement of said roller, whereby angular adjustment of said roller as to its lowered position may be effected.

JOHN J. LINDEN.

Witnesses:
J. F. BRANDENBURG,
WHITEFIELD SAMMIS.

---

Copies of this patent may be obtained for five cents each, by addressing the "Commissioner of Patents, Washington, D. C."